(12) United States Patent
Muthrasanallur et al.

(10) Patent No.: US 8,782,461 B2
(45) Date of Patent: Jul. 15, 2014

(54) METHOD AND SYSTEM OF LIVE ERROR RECOVERY

(75) Inventors: Sridhar Muthrasanallur, Bangalore (IN); Debendra Das Sharma, Santa Clara, CA (US); Jayakrishna P. S, Bangalore (IN); Eric R. Wehage, Tenino, WA (US)

(73) Assignee: Intel Corporation, Santa Clara, CA (US)

( * ) Notice: Subject to any disclaimer, the term of this patent is extended or adjusted under 35 U.S.C. 154(b) by 500 days.

(21) Appl. No.: 12/889,954

(22) Filed: Sep. 24, 2010

(65) Prior Publication Data
US 2012/0079312 A1    Mar. 29, 2012

(51) Int. Cl.
*G06F 11/00*    (2006.01)

(52) U.S. Cl.
USPC ............................... 714/4.1; 714/4.5; 714/43

(58) Field of Classification Search
USPC .......... 714/4.1, 4.5, 5.1, 5.11, 23, 24, 25, 43, 714/44
See application file for complete search history.

(56) References Cited

U.S. PATENT DOCUMENTS

| | | |
|---|---|---|
| 5,528,749 A | 6/1996 | Landis |
| 6,671,831 B1 | 12/2003 | Sartore et al. |
| 2002/0095624 A1 | 7/2002 | Cabezas et al. |
| 2005/0283638 A1* | 12/2005 | Kato .............................. 714/2 |
| 2006/0271718 A1 | 11/2006 | DiPlacido, Jr. et al. |
| 2007/0240018 A1* | 10/2007 | Nalawadi et al. ............... 714/23 |
| 2009/0063894 A1* | 3/2009 | Billau et al. ...................... 714/5 |
| 2010/0251014 A1* | 9/2010 | Yagi ................................ 714/9 |
| 2011/0320861 A1* | 12/2011 | Bayer et al. .................. 714/5.11 |

FOREIGN PATENT DOCUMENTS

| | | |
|---|---|---|
| KR | 1019990084442 | 12/1999 |
| WO | 2012/040658 A1 | 3/2012 |

OTHER PUBLICATIONS

International Search Report and Written Opinion for PCT Patent Application No. PCT/US2011/053142 Mailed Mar. 2, 2012, 10 Pages.
International Preliminary Report on Patentability for PCT Patent Application No. PCT/US2011/053142, Mailed Apr. 4, 2013, 7 Pages.
Office Action Received for Taiwan Patent Application No. 100134378, mailed on Dec. 9, 2013, 17 pages of office action including 8 pages of English Translation.

* cited by examiner

*Primary Examiner* — Joseph D Manoskey
(74) *Attorney, Agent, or Firm* — Law Office of Herbert T. Patty

(57) ABSTRACT

A method and system of error recovery of a device attached to a platform without requiring a system reset. In one embodiment of the invention, a platform detects an error(s) of an attached device and shuts down the communication link with the attached device. The platform corrects the error(s) and automatically re-trains the communication link with the attached device. In this way, no reset of the platform is required to correct the detected error(s) in one embodiment of the invention.

22 Claims, 6 Drawing Sheets

METHOD AND SYSTEM OF LIVE ERROR RECOVERY

FIELD OF THE INVENTION

This invention relates to error recovery, and more specifically but not exclusively, to a method and system of error recovery of a device attached to a system without requiring a system reset.

BACKGROUND DESCRIPTION

A platform typically has several peripheral devices connected via a communication interface. When any one of the devices connected to the platform experiences an uncorrectable error, a reset of the platform is required to correct the uncorrectable error. The reset of the platform prevent the propagation of the uncorrectable error.

Although the reset of the platform can solve the uncorrectable error in the device, the reset of the platform reduces the reliability of the platform. In mission critical computer platforms or servers, the reset of the platform when an uncorrectable error is encountered can have a huge impact on the required 99.999% uptime of the platform.

BRIEF DESCRIPTION OF THE DRAWINGS

The features and advantages of embodiments of the invention will become apparent from the following detailed description of the subject matter in which.

DETAILED DESCRIPTION

Figure 1:
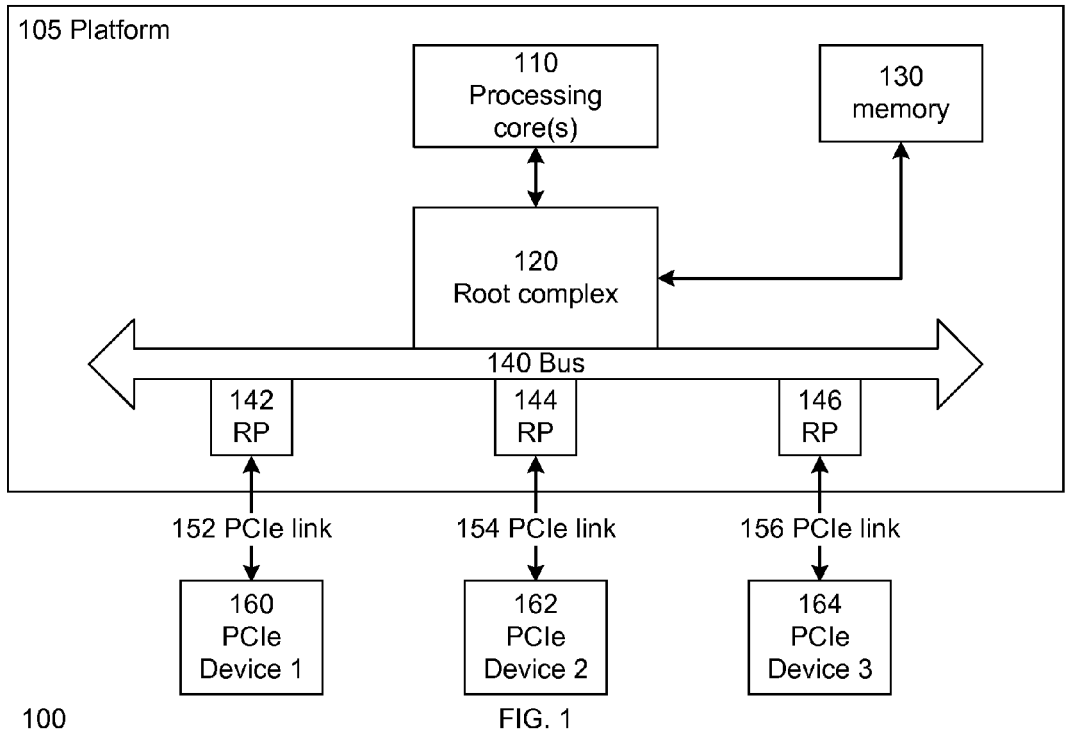
FIG. 1 illustrates a block diagram of a platform in accordance with one embodiment of the invention.

Embodiments of the invention described herein are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference numerals have been repeated among the figures to indicate corresponding or analogous elements. Reference in the specification to "one embodiment" or "an embodiment" of the invention means that a particular feature, structure, or characteristic described in connection with the embodiment is included in at least one embodiment of the invention. Thus, the appearances of the phrase "in one embodiment" in various places throughout the specification are not necessarily all referring to the same embodiment.

Embodiments of the invention provide a method and system of error recovery of a device attached to a system without requiring a system reset. In one embodiment of the invention, a system or platform detects an error(s) of an attached device and shuts down the communication link with the attached device. The platform corrects the error(s) and automatically re-trains the communication link with the attached device. In this way, no reset of the platform is required to correct the detected error(s) in one embodiment of the invention. The platform or system includes, but is not limited to, a desktop computer, a laptop computer, a net book, a notebook computer, a personal digital assistant (PDA), a server, a workstation, a cellular telephone, a mobile computing device, an Internet appliance or any other type of computing device.

The platform is able to select one or more types of error for live error recovery in one embodiment of the invention. The error includes, but is not limited to, an uncorrectable error, a correctable error, a non-fatal, a fatal error, and other types of error classification. An uncorrectable error includes, but is not limited to, an error condition that impacts the functionality of the interface of the platform. A correctable error includes, but is not limited to, an error condition where the hardware of the platform can recover without any loss of Information. A fatal error includes, but is not limited to, an uncorrectable error condition which renders a particular communication link and related hardware unreliable. A non-fatal error includes, but is not limited to, an uncorrectable error which cause a particular transaction to be unreliable but the communication link is otherwise fully functional.

FIG. 1 illustrates a block diagram 100 of a platform 105 in accordance with one embodiment of the invention. In one embodiment of the invention, the platform is compliant at least in part with the Peripheral Component Interconnect (PCI) Express (PCIe) standard or specification maintained by the PCI Special Interest Group (PCI-SIG).

In one embodiment of the invention, the platform 105 has a processing core(s) 110 coupled to a Root Complex 120. The Root Complex 120 is coupled with a bus 140, and a memory 130 and supports three Root Ports 142, 144 and 146. The Root Ports 142, 144 and 146 are coupled to the PCIe endpoint devices 1-3 160, 162 and 164 respectively via the PCIe communication links 152, 154, and 156. In one embodiment of the invention, the Root Complex 120 generates transaction requests on behalf of the processor core(s) 110. In one embodiment of the invention, the Root Complex 120 is integrated with the processing core 120.

In one embodiment of the invention, each of the Root Ports 142, 144 and 146 has logic to perform live error recovery when an error is detected. In one embodiment of the invention, the live error recovery of each of the Root Ports 142, 144 and 146 facilitates an automatic recovery of their respective PCIe communication link when an error is detected without requiring a reset of the platform 105.

For example, in one embodiment of the invention, the Root Port 142 has a state machine to detect for any error of the PCIe device 160. For example, in one embodiment of the invention, the physical layer (PHY) of the Root Port 142 detects a receiver error when receiving packets from the PCIe device 1 160 and traps the receiver error. The Root Port 142 forces down or shut downs the link state of the PCIe communication link 152 after the detection of the receiver error. By doing so, the Root Port 142 prevents any propagating of the error(s) or errant packet(s) in one embodiment of the invention.

The Root Port 142 indicates to the platform 105 that an error has been detected and trapped for the PCIe communication link 152. In one embodiment of the invention, the indication of the Root Port 142 to indicate to the platform 105 includes, but is not limited to, setting an interrupt signal, writing of registers, sending a signal to the processing core(s) 110 and the like. One of ordinary skill in the relevant art will readily appreciate that the Root Port 142 can use any other method or mechanism to indicate to the platform 105 that an error has been detected and trapped. The other method or mechanism can be used without affecting the workings of the invention.

When the platform 105 has received the indication from the Root Port 142 that an error has been detected and trapped for the PCIe communication link 152, the platform 105 corrects or rectifies the uncorrectable error. In one embodiment of the invention, the platform 105 uses software to perform error handling or management of the error. When the platform 105 has finished correcting the error, the platform 105 sends an indication that the error recovery is completed.

The Root Port 142 re-activates the PCIe communication link 152 after receiving the indication from the platform 105 that the error recovery is completed. The Root Port 142 re-trains the PCIe communication link 152 and brings the PCIe communication link 152 to a LinkUp state when the re-training is completed. A signal or indication is sent to the Link Training and Status State Machine (LTSSM) by the Root Port 142 and the platform 105 initializes the Root Port 142 and allows the PCIe device 1 160 to resume normal operation.

The workings of the Root Port 144 and 146 are similar to the Root Port 142 and shall not be repeated herein. The configuration of the platform 105 is not meant to be limiting and other configurations of the platform 105 can be used without affecting the workings of the invention.

Figure 2:
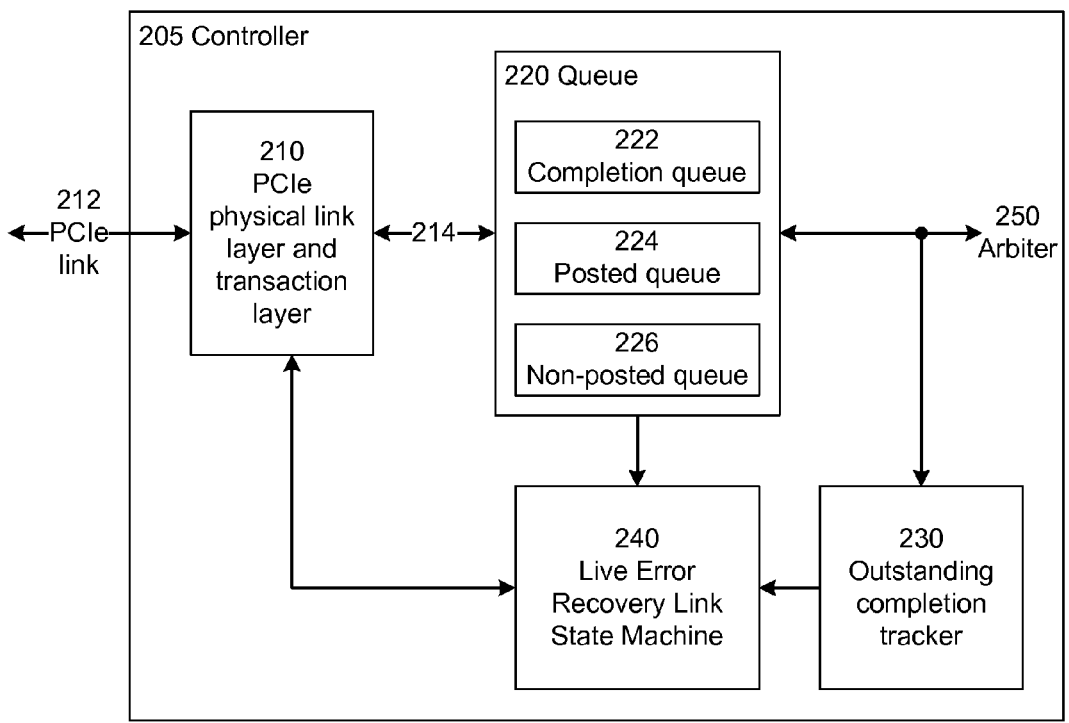
FIG. 2 illustrates a controller in accordance with one embodiment of the invention.

FIG. 2 illustrates a controller 205 in accordance with one embodiment of the invention. For clarity of illustration, FIG. 2 is discussed with reference to FIG. 1. In one embodiment of the invention, each of the Root Ports 142, 144 and 146 has the controller 205 to perform live error recovery when an error is detected.

In one embodiment of the invention, the controller 205 has a PCIe physical link layer and transaction layer 210 and a request queue 220. The request queue 220 is coupled with the arbiter 250 for port arbitration of the Root Port. The PCIe physical link layer and transaction layer 210 provides the PCIe communication link 212 to facilitate communication between a Root Port and a PCIe endpoint device. The PCIe packets from the PCIe endpoint device are received from the PCIe communication link 212 and the transaction layer processes the PCIe. One of ordinary skill in the relevant art will readily appreciate the workings of the physical link layer and transaction layer 220 and shall not be described.

The request queue 220 maintains a completion queue 222, a posted request queue 224 and a non-posted request queue 226. In one embodiment of the invention, the request of the controller 205 refers to a packet that initiates a transaction sequence. A request includes, but is not limited to, operation code, address and length, data, or any other information. A transaction sequence includes, but is not limited to, a single request and zero or more completions associated with carrying out a single logical transfer by a Requester. A completion includes, but is not limited to, a packet that is used to terminate transaction sequence, a packet that is used to partially terminate a transaction sequence and the like. Each completion corresponds to a preceding request in one embodiment of the invention.

The completion queue 222 keeps track of the completions and the completion includes, but is not limited to, a read request completion, an Input/Output (I/O) write completion, a configuration write completion, and the like. The posted request queue 224 keeps track of the posted requests and the posted request includes, but is not limited to, a memory write request, a message request and the like. The non-posted request queue 226 keeps track of the non-posted requests and the non-posted request includes, but is not limited to, a read request, an Input/Output (I/O) write request, a configuration write request, and the like.

The live error recovery link state machine 240 is coupled with the PCIe physical link layer and transaction layer 210 and the request queue 220. The live error recovery link state machine 240 facilitates an error recovery of a Root Port without requiring a reset of the platform 105 in one embodiment of the invention. The live error recovery link state machine 240 monitors whether any error has been detected by the PCIe physical link layer and transaction layer 210. In one embodiment of the invention, the transaction layer keeps track of the detected error(s).

The live error recovery link state machine 240 identifies the type of error and deactivates the PCIe communication link 212 when the identified error requires error recovery. In one embodiment of the invention, the live error recovery link state machine 240 performs error recovery when an uncorrectable error is detected. The live error recovery link state machine 240 may also perform error recovery for other types of errors in another embodiment of the invention.

The live error recovery link state machine 240 deactivates the PCIe communication link 212 by setting the LTSSM to a Link Down state in one embodiment of the invention. The live error recovery link state machine 240 sends an advisory message or notification to the software in the platform 105 that an error has been detected.

The live error recovery link state machine 240 aborts or cancels the outbound or outgoing requests of the controller 205. The outbound requests include, but are not limited to, the outbound posted requests, the outbound completions, and the outbound non-posted requests. In one embodiment of the invention, the outbound non-posted requests are aborted by using a Master abort operation.

The live error recovery link state machine 240 checks the request queue 220 to determine the inbound requests that are received before the errant request that caused the error. The inbound requests that are received before the errant request that caused the error are allowed to drain normally in one embodiment of the invention. The inbound requests that are received after the errant request that caused the error are dropped or discarded in one embodiment of the invention.

The outstanding completion tracker 230 is coupled with the request queue 220 and the live error recovery link state machine 240. The outstanding completion tracker 230 keeps track of the pending outbound non-posted requests for which a completion has not been received and the outbound non-posted requests that have been dropped by the live error recovery link state machine 240. The outstanding completion tracker 230 sends the list of outbound non-posted requests to the live error recovery link state machine 240.

The live error recovery link state machine 240 generates a master abort completion for each of the original requestor of the pending outbound non-posted requests for which a completion has not been received. The live error recovery link state machine 240 also generates a master abort completion for each of the original requestor of the outbound non-posted requests that have been dropped. By sending the master abort completion, the live error recovery link state machine 240 prevents a completion time out in one embodiment of the invention.

When the error recovery is completed, the live error recovery link state machine 240 activates the PCIe communication link 212. In embodiment of the invention, the live error recovery link state machine 240 activates the PCIe communication link 212 by setting the LTSSM to a Link Up state in one embodiment of the invention. The LTSSM re-trains the PCIe communication link 212 and the software on the platform 105 initializes the Root Port when the PCIe communication link 212 is active.

The description of the controller 205 is not meant to be limiting and other configurations of the controller 205 can be used without affecting the workings of the invention. For example, in one embodiment of the invention, the live error recovery link state machine 240 and the outstanding completion tracker 230 are combined into a single module.

Figure 3:
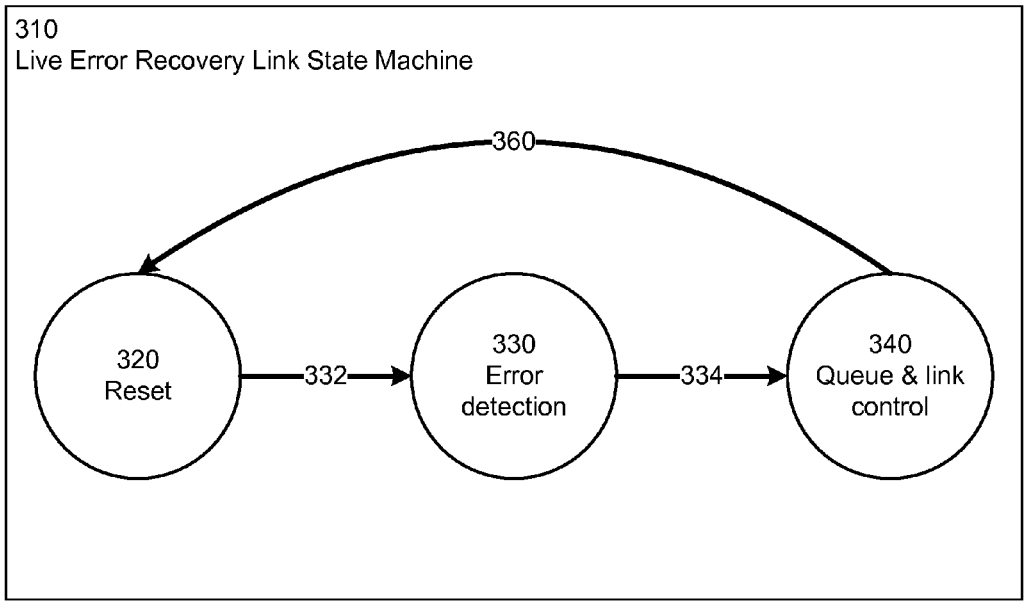
FIG. 3 illustrates a live error recovery link state machine in one embodiment of the invention.

FIG. 3 illustrates a live error recovery link state machine 310 in one embodiment of the invention. For clarity of illustration, FIG. 3 is discussed with reference to FIG. 2. The live error recovery link state machine 310 has a reset state 320, an error detection state 330 and a queue and link control state 340.

When the controller 210 is activated, the live error recovery link state machine 310 enters the reset state 320. In the reset state 320, the live error recovery link state machine 310 initializes its settings. For example, in one embodiment of the invention, the live error recovery link state machine 310 sets the type of error(s) to be monitored for error recovery during the reset stage. In another embodiment of the invention, the live error recovery link state machine 310 can be switched on and off. In one embodiment of the invention, the activation of the live error recovery link state machine 310 can be controlled by a register bit(s) setting. In another embodiment of the invention, the activation of the live error recovery link state machine 310 can be controlled by an enable signal. One of ordinary skill in the relevant art will readily appreciate that other ways of controlling the activation of the live error recovery link state machine 310 can be used without affecting the workings of the invention.

After the initialization in the reset state 320, the live error recovery link state machine 310 enters the error detection state 330. In one embodiment of the invention, the live error recovery link state machine 310 enters the error detection state 330 only when the live error recovery link state machine 310 is enabled or activated. In the error detection state 330, the live error recovery link state machine 310 checks whether an error has been detected.

In one embodiment of the invention, the live error recovery link state machine 310 checks whether an error has been detected by reading the error log of the PCIe physical link layer and transaction layer 210. In another embodiment of the invention, the PCIe physical link layer and transaction layer 210 sends an error signal or indication to the live error recovery link state machine 310 when an error has been detected. One of ordinary skill in the relevant art will readily appreciate that other ways of detecting an error can be used without affecting the workings of the invention.

In the error detection state 330, the live error recovery link state machine 310 sends an indication when an error has been detected. For example, in one embodiment of the invention, the live error recovery link state machine 310 asserts an interrupt signal when an error has been detected. The software reads the interrupt signal and performs error recovery when the interrupt signal has been asserted.

The live error recovery link state machine 310 goes to the queue & link control state 340 and deactivates the PCIe communication link 212. The live error recovery link state machine 310 performs error recovery of the request queue 220 in one embodiment of the invention. When the live error recovery link state machine 310 has finished master aborting the pending outbound non-posted queues and the outbound requests that have been dropped, the live error recovery link state machine 310 asserts a quiesced signal in one embodiment of the invention. The quiesced signal indicates to the software in the platform that there is no traffic or packets pending in the Root Port.

When the live error recovery link state machine 310 has finished the error handling of the request quest 220, it activates the PCIe communication link 212 and it goes back to the reset state 320. The live error recovery link state machine 310 allows the platform 105 to handle errors without requiring a system reset to achieve high Reliability, Availability and Serviceability (RAS).

Figure 4:
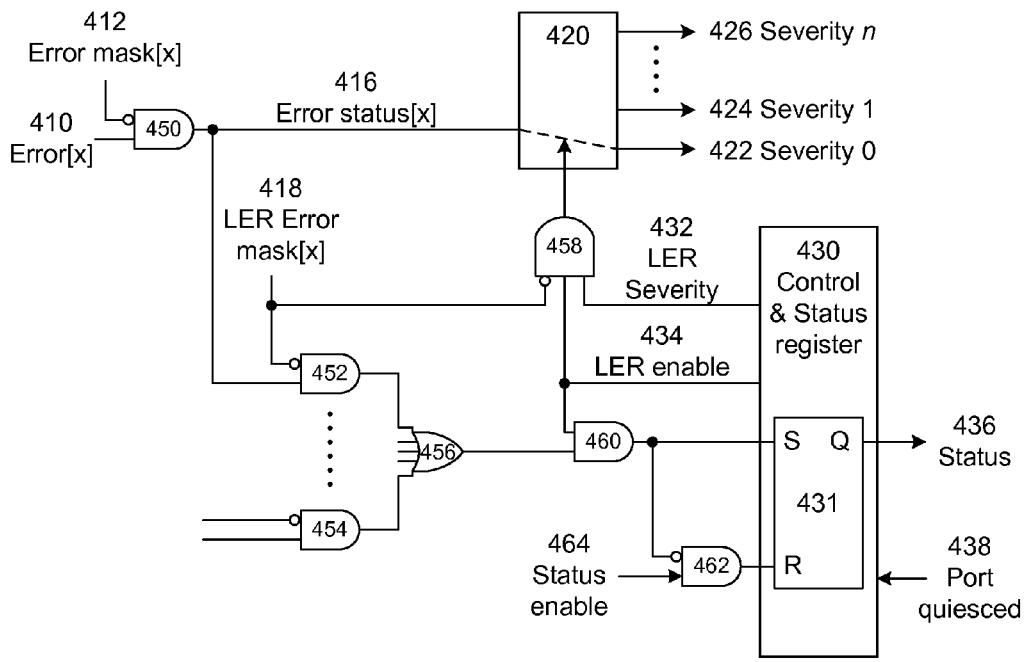
FIG. 4 illustrates a block diagram of a live error recovery logic in accordance with one embodiment of the invention.

FIG. 4 illustrates a block diagram 400 of a live error recovery (LER) logic in accordance with one embodiment of the invention. The LER logic is controlled by a control and status register 430 in one embodiment of the invention. In one embodiment of the invention, the control and status register 430 has a LER severity signal 432, a LER enable signal 434, a status signal 436, a port quiesced signal 438. In one embodiment of the invention, the control and status register 430 has a flip-flop (not shown) to store the setting for each of the LER severity signal 432, the LER enable signal 434, the status signal 436, and the port quiesced signal 438.

The LER enable signal 434 controls the activation and deactivation of the LER logic. The error[x] signal 410 illustrates an error signal or indication that an error has been detected and x represents a particular type of error. The error mask[x] signal 412 is a signal that controls the error[x] signal 410. For example, in one embodiment of the invention, the error[x] signal 410 represents or indicates a completion timeout error. When a completion timeout error is detected, the error[x] signal 410 is asserted to logic high. The error mask[x] signal 412 and the error[x] signal 410 are coupled with the inputs of a AND gate 450. The error mask[x] signal 412 controls whether the error[x] signal 410 is set as the output signal, error status[x] 416, of the AND gate 450.

The error status[x] 416 is gated with the LER error mask[x] signal 418 using a AND gate 452. The LER error mask[x] signal 418 controls whether the error status[x] 416 is set as the output signal of the AND gate 452. The output signal of the AND gate 452 is coupled with a logic OR gate 456. The output of the OR gate 456 is gated with the LER enable signal 434 using a AND gate 460.

The LER enable signal 434 controls whether the output signal of the AND gate 460 is set as the input signal of the flip flop 431. The reset signal of the flip flop 431 is controlled by a AND gate 462. The output signal of the AND gate 460 and the status enable signal 464 provide the input to the AND gate 462. The status enable signal 464 controls whether the output signal of the AND gate 460 is set as the output signal, status signal 436, of the flip-flop 431. The status signal 436 indicates to the software to perform error management of the request queue in one embodiment of the invention.

When the error management of the request queue 220 is completed, the software asserts the port quiesced signal 438. The port quiesced signal 438 indicates that there are no pending completions and the error recovery is completed. In one embodiment of the invention, each error is associated with a severity level. For example, in one embodiment of the invention, a correctable error is associated with a severity level of 0 422, an uncorrectable and non-fatal error is associated with a severity level of 1. The severity level of n illustrates that there can be more than two severity levels.

In one embodiment of the invention, the error[x] status signal 410 is associated with a particular severity level. The logic block 420 allows the severity level of the error[x] status signal 410 to be forced to a severity level of zero when the output of the AND gate 458 is asserted. The inputs of the AND gate 458 are coupled to the LER severity signal 432, the LER enable signal 458, and the LER error mask[x] signal 418. When the LER enable signal 458 is set to logic one and the LER error mask[x] signal 418 is set to logic zero, the LER severity signal 432 controls the output of the AND gate 458. To force the severity level of the error[x] status signal 410 to zero, the LER severity signal 432 is asserted in one embodiment of the invention. This allows control of the settings of the severity of the error.

For clarity of illustration, the block diagram 400 of the LER logic illustrates the logic required for a particular error. For each additional error supported by LER, the logic is duplicated. The OR gate 456 is coupled with each additional error supported by LER. One of ordinary skill in the relevant art will readily appreciate the logic required for each additional error and it shall not be described herein. The settings of the various signals illustrated in FIG. 4 can be configured using one or more register bits (not shown). One of ordinary skill in the relevant art will readily appreciate other configurations of the LER logic can be used without affecting the workings of the invention.

Figure 5:
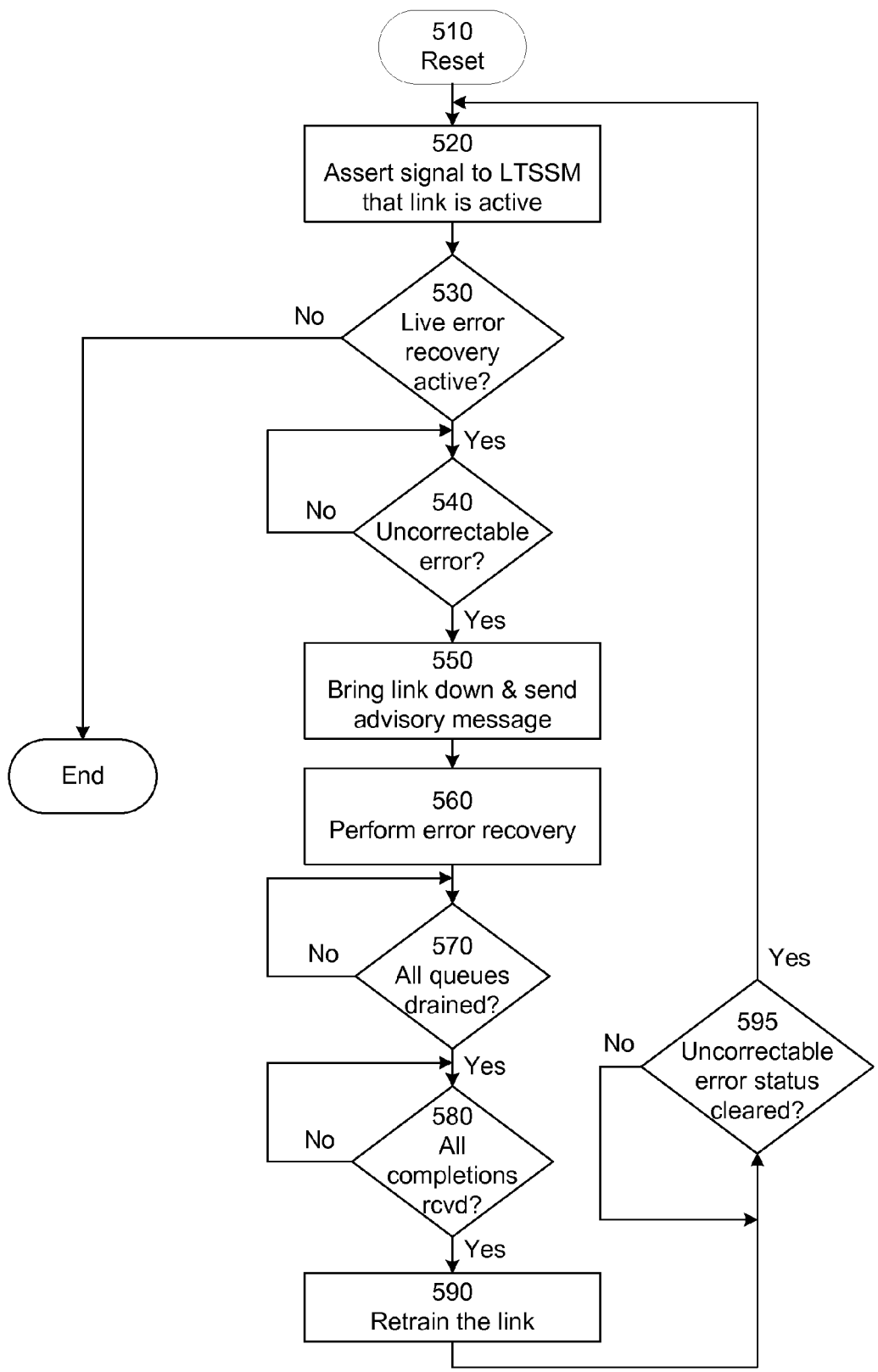
FIG. 5 illustrates a flowchart of live error recovery in accordance with one embodiment of the invention.

FIG. 5 illustrates a flowchart 500 of live error recovery in accordance with one embodiment of the invention. For clarity of illustration, FIG. 5 is discussed with reference to FIGS. 2 and 4. In step 510, the LER link state machine 240 enters into the reset state. In the reset state, the LER link state machine 240 is initialized. In step 520, the LER link state machine 240 asserts a signal to the LTSSM that the PCIe communication link is active or ready. In step 530, the flow 500 checks if the LER is active or enabled. In one embodiment of the invention, the flow 500 checks the LER enable signal 434 to determine if the LER is active.

If the LER is not active, the flow 500 ends. If LER is active, the flow 500 goes to step 540 to check if an uncorrectable error has been detected. If no uncorrectable error has been detected, the flow 500 goes to step 540 to keep monitoring for an uncorrectable error. If an uncorrectable error has been detected, the flow 500 goes to step 550 to bring down or deactivate the PCIe communication link. An advisory message is sent to indicate the detection of an uncorrectable error. In one embodiment of the invention, the advisory message is sent to software so that the software can take corrective action for the detected uncorrectable error.

In step 560, the flow 500 performs error recovery or corrective action of the detected error. In step 570, the flow 500 checks if the inbound and outbound queues are drained. If no, the flow 500 goes back to step 570. If yes, the flow 500 goes to step 580 to check if all completions have been received. The step 580 waits until all the outstanding completions are received for the processed non-posted transactions to ensure stale completions are not sent subsequently. If no, the flow 500 goes back to step 580. If yes, the flow 500 goes to step 590 to retrain the PCI communication link. In step 595, the flow 500 checks if the status of the uncorrectable error is cleared. In one embodiment of the invention, step 595 is performed during an interrupt service routine after the advisory message is sent. If the status of the uncorrectable error is not cleared, the flow 500 goes back to step 595. If the status of the uncorrectable error is cleared, the flow 500 goes back to step 510.

Figure 6:
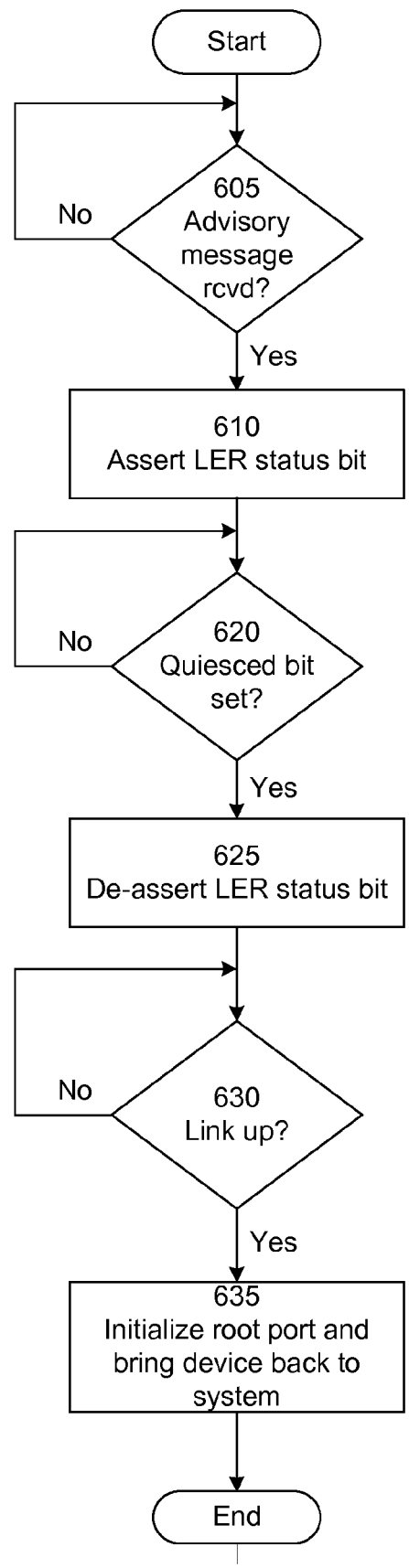
FIG. 6 illustrates a flowchart of live error recovery in accordance with one embodiment of the invention.

FIG. 6 illustrates a flowchart 600 of live error recovery in accordance with one embodiment of the invention. For clarity of illustration, FIG. 6 is discussed with reference to FIGS. 2 and 4.

In step 605, the flow 600 checks if an advisory message has been received. If no, the flow 600 goes back to step 605. If yes, the flow 600 goes to step 610 to assert the LER status bit. In step 620, the flow 600 checks if the quiesced bit has been set. The quiesced bit indicates whether there are any pending transactions.

If the quiesced bit is not set, the flow 600 goes back to step 620. If the quiesced bit is set, the flow 600 de-asserts the LER status bit. In step 630, the flow 600 checks whether the PCIe communication link is active. If no, the flow 600 goes back to step 630. If yes, the flow goes to 635 to initialize the Root Port and bring the PCIe endpoint device back to the system and the flow 600 ends.

Figure 7:
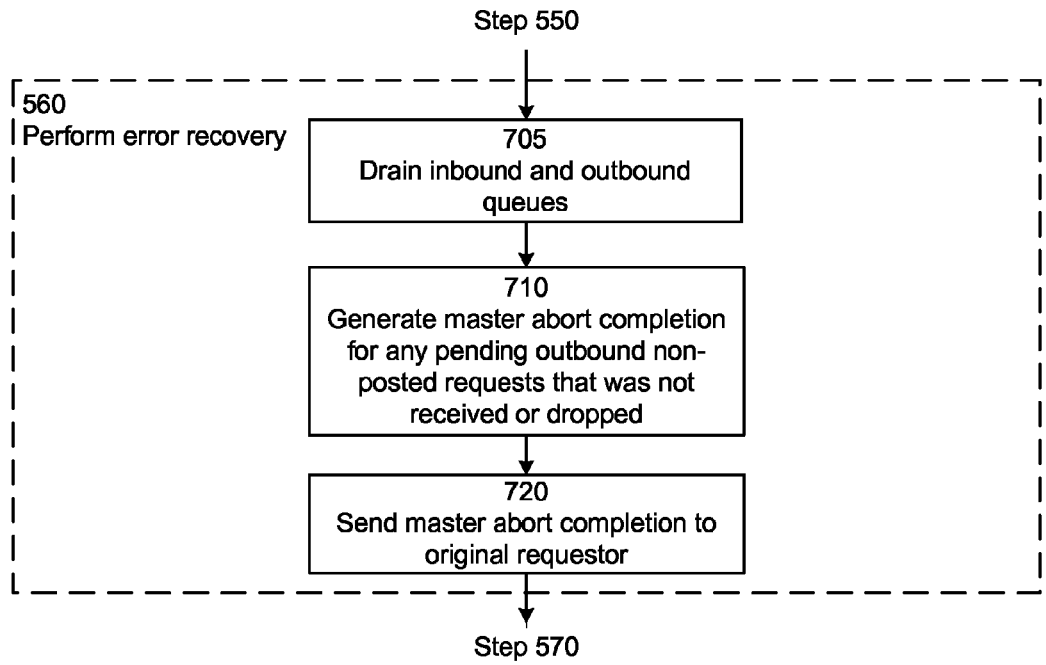
FIG. 7 illustrates a flowchart of live error recovery in accordance with one embodiment of the invention.

FIG. 7 illustrates a flowchart 700 of live error recovery in accordance with one embodiment of the invention. For clarity of illustration, FIG. 7 is discussed with reference to FIG. 5. In step 705, the inbound and outbound queues are drained. In one embodiment of the invention, the step 705 ensures that all the inbound received posted and non-posted transactions and completions are drained out from the inbound queue. The step 705 also aborts any transaction forwarded to the faulty link.

In step 710, the flow 700 generates a master abort completion for any pending outbound non-posted requests that was not received or dropped. In step 720, flow 700 send a master abort completion to the original requestor of each pending outbound non-posted requests that was not received or dropped. In one embodiment of the invention, the flows 500 and 700 are performed by hardware and the flow 600 is performed by software. In another embodiment of the invention, the flows 500, 600 and 700 can be performed by any combination of hardware and software/firmware. For example, in one embodiment of the invention, the flow 600 is performed by a driver software of the platform 105.

Figure 8:
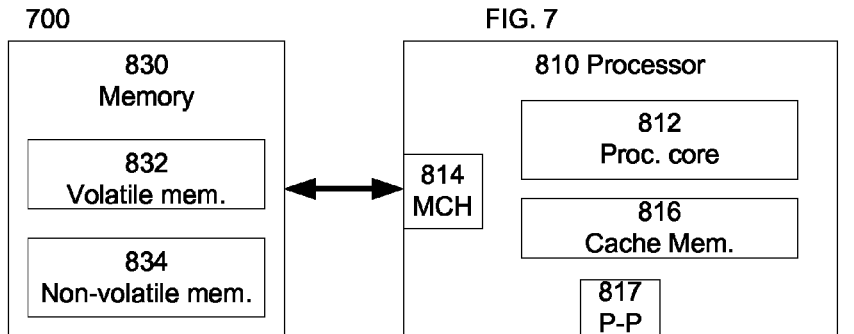
FIG. 8 illustrates a system to implement the methods disclosed herein in accordance with one embodiment of the invention.
Figure 8:
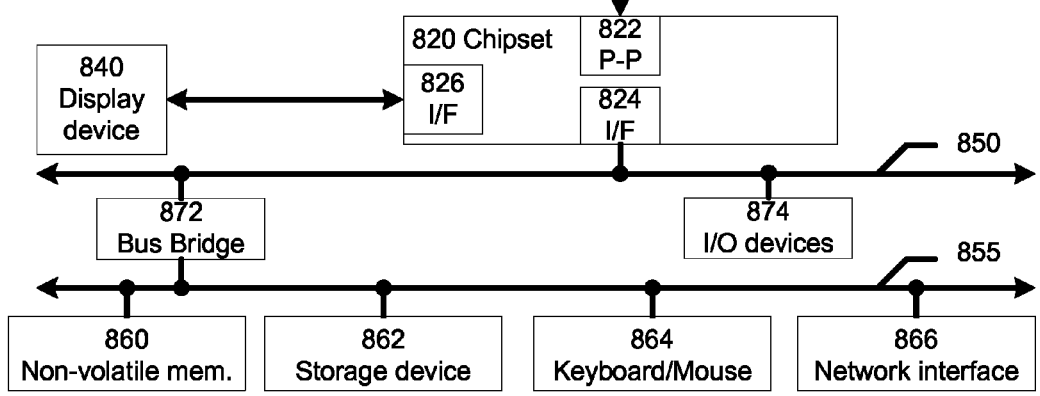

FIG. 8 illustrates a system 800 to implement the methods disclosed herein in accordance with one embodiment of the invention. The system 800 includes, but is not limited to, a desktop computer, a laptop computer, a net book, a notebook computer, a personal digital assistant (PDA), a server, a workstation, a cellular telephone, a mobile computing device, an Internet appliance or any other type of computing device. In another embodiment, the system 800 used to implement the methods disclosed herein may be a system on a chip (SOC) system.

The processor 810 has a processing core 812 to execute instructions of the system 800. The processing core 812 includes, but is not limited to, pre-fetch logic to fetch instructions, decode logic to decode the instructions, execution logic to execute instructions and the like. The processor 810 has a cache memory 816 to cache instructions and/or data of the system 800. In another embodiment of the invention, the cache memory 816 includes, but is not limited to, level one, level two and level three, cache memory or any other configuration of the cache memory within the processor 810.

The memory control hub (MCH) 814 performs functions that enable the processor 810 to access and communicate with a memory 830 that includes a volatile memory 832 and/or a non-volatile memory 834. The volatile memory 832 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. The non-volatile memory 834 includes, but is not limited to, NAND flash memory, phase change memory (PCM), read only memory (ROM), electrically erasable programmable read only memory (EEPROM), or any other type of non-volatile memory device.

The memory 830 stores information and instructions to be executed by the processor 810. The memory 830 may also stores temporary variables or other intermediate information while the processor 810 is executing instructions. The chipset 820 connects with the processor 810 via Point-to-Point (PtP) interfaces 817 and 822. The chipset 820 enables the processor 810 to connect to other modules in the system 800. In one embodiment of the invention, the interfaces 817 and 822 operate in accordance with a PtP communication protocol such as the Intel® QuickPath Interconnect (QPI) or the like. The chipset 820 connects to a display device 840 that includes, but is not limited to, liquid crystal display (LCD), cathode ray tube (CRT) display, or any other form of visual display device.

In addition, the chipset 820 connects to one or more buses 850 and 855 that interconnect the various modules 874, 860, 862, 864, and 866. Buses 850 and 855 may be interconnected together via a bus bridge 872 if there is a mismatch in bus speed or communication protocol. The chipset 820 couples with, but is not limited to, a non-volatile memory 860, a mass storage device(s) 862, a keyboard/mouse 864 and a network interface 866. The mass storage device 862 includes, but is not limited to, a solid state drive, a hard disk drive, an universal serial bus flash memory drive, or any other form of computer data storage medium. The network interface 866 is implemented using any type of well known network interface standard including, but not limited to, an Ethernet interface, a universal serial bus (USB) interface, a Peripheral Component Interconnect (PCI) Express interface, a wireless interface and/or any other suitable type of interface. The wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 8 are depicted as separate blocks within the system 800, the functions performed by some of these blocks may be integrated within a single semiconductor circuit or may be implemented using two or more separate integrated circuits. For example, although the cache memory 816 is depicted as a separate block within the processor 810, the cache memory 816 can be incorporated into the processor core 812 respectively. The system 800 may include more than one processor/processing core in another embodiment of the invention.

Figure 9:
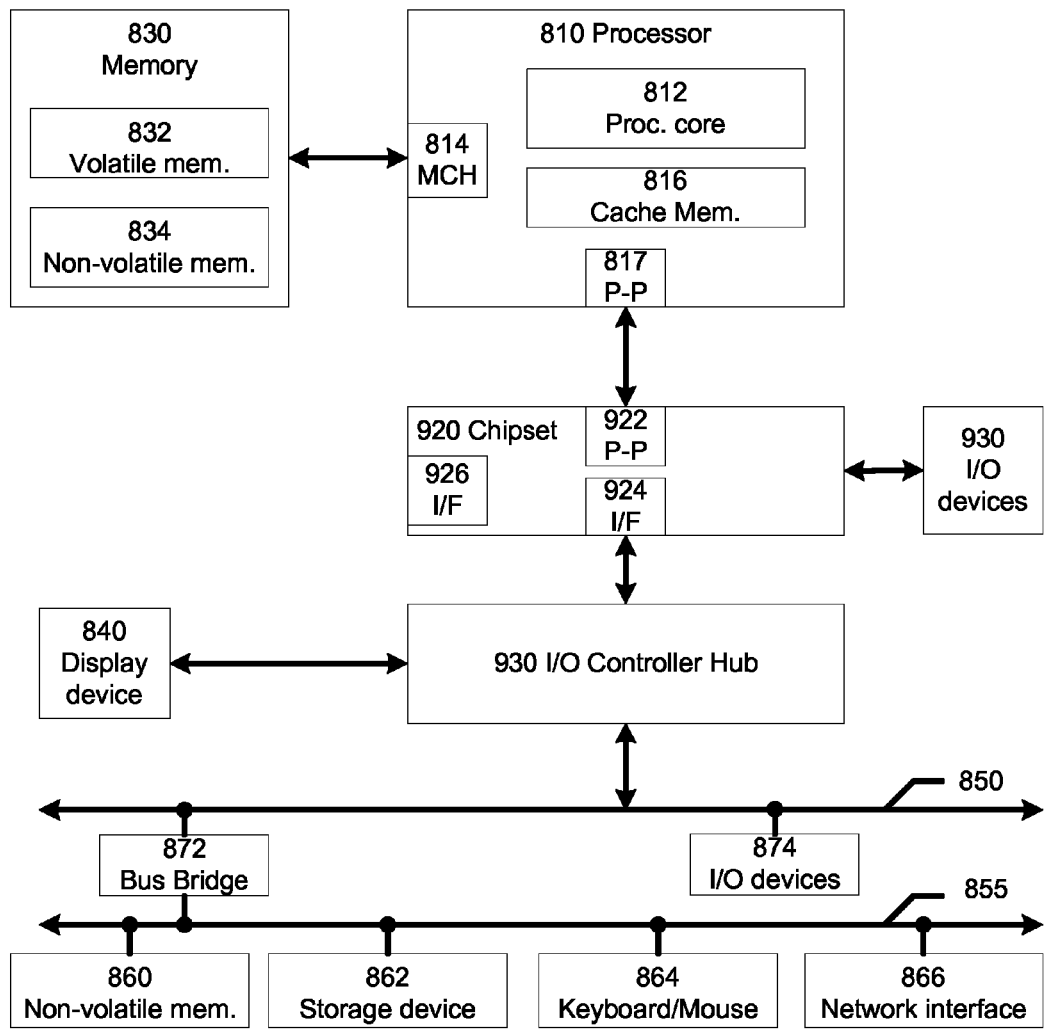
FIG. 9 illustrates a system to implement the methods disclosed herein in accordance with one embodiment of the invention.

FIG. 9 illustrates a system 900 to implement the methods disclosed herein in accordance with one embodiment of the invention. The system 900 has an I/O controller hub (ICH) that is coupled to the chipset 920 and the one or more buses 850 and 855 that interconnect the various modules 874, 860, 862, 864, and 866. In one embodiment of the invention, the ICH has logic to perform error recovery of a device attached to the system 900 without requiring a system reset. The workings of the elements in the system 900 are similar to the elements present in the system 800 and shall not be described herein.

The methods disclosed herein can be implemented in hardware, software, firmware, or any other combination thereof. Although examples of the embodiments of the disclosed subject matter are described, one of ordinary skill in the relevant art will readily appreciate that many other methods of implementing the disclosed subject matter may alternatively be used. In the preceding description, various aspects of the disclosed subject matter have been described. For purposes of explanation, specific numbers, systems and configurations were set forth in order to provide a thorough understanding of the subject matter. However, it is apparent to one skilled in the relevant art having the benefit of this disclosure that the subject matter may be practiced without the specific details. In other instances, well-known features, components, or modules were omitted, simplified, combined, or split in order not to obscure the disclosed subject matter.

The term "is operable" used herein means that the device, system, protocol etc, is able to operate or is adapted to operate for its desired functionality when the device or system is in off-powered state. Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

The techniques shown in the figures can be implemented using code and data stored and executed on one or more computing devices such as general purpose computers or computing devices. Such computing devices store and communicate (internally and with other computing devices over a network) code and data using machine-readable media, such as machine readable storage media (e.g., magnetic disks; optical disks; random access memory; read only memory; flash memory devices; phase-change memory) and machine readable communication media (e.g., electrical, optical, acoustical or other form of propagated signals—such as carrier waves, infrared signals, digital signals, etc.).

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. An apparatus comprising:
   a controller to:
   set one or more types of errors to be monitored for a device coupled with the apparatus;
   detect an error associated with the device coupled with the apparatus;
   determine whether a type of the detected error matches the set one or more types of errors; and
   send an advisory message that an uncorrectable error has been detected;
   in response to the determination that the type of the detected error matches the set one or more types of errors,
   trap the detected error associated with the device coupled with the apparatus; and
   correct the detected error without a reset of the apparatus.

2. The apparatus of claim 1, wherein the device is coupled with the apparatus via a communication link, and wherein the controller to trap the detected error is to:
   deactivate the communication link.

3. The apparatus of claim 2, wherein the controller is further to:
   activate the communication link in response to the correction of the detected error without the reset of the apparatus.

4. The apparatus of claim 1, wherein the controller to correct the detected error without the reset of the apparatus is to:
- abort all of one or more outbound requests;
- abort all of one or more inbound requests received after the detected error; and
- drain all of one or more inbound requests of the device received before the detected error.

5. The apparatus of claim 4, wherein the outbound requests comprises one or more of posted transactions, non-posted transactions, and completed transactions, and wherein the controller to abort all of one or more outbound requests of the apparatus is to:
- discard all posted transactions and completed transactions; and
- perform a master abortion of the non-posted transactions.

6. The apparatus of claim 4, wherein the controller is further to:
- generate a master abort completion for each of an original requestor of one or more pending outbound non-posted requests, wherein no completion has been received for the one or more pending outbound non-posted requests.

7. The apparatus of claim 4, wherein the controller is further to:
- generate a master abort completion for each of an original requestor of one or more discarded outbound non-posted requests, wherein no completion has been received for the one or more discarded outbound non-posted requests.

8. The apparatus of claim 1, wherein the device is a Peripheral Component Interconnect Express (PCIe) compliant device, and wherein the controller is part of a Root Port logic.

9. A system comprising:
a processing core; and
a root complex coupled with the processing core, the root complex supporting one or more Root Ports, wherein each Root Port is to:
- set one or more types of errors to be monitored for a device coupled with each Root Port;
- detect an error associated with the device coupled with the Root Port;
- determine whether a type of the detected error matches the set one or more types of errors; and
- send an advisory message that an uncorrectable error has been detected;
- in response to the determination that the type of the detected error matches the set one or more types of errors, perform error recovery of the detected error without resetting the system.

10. The system of claim 9, wherein each Root Port to perform the error recovery of the detected error without resetting the system is further to discard all outbound transactions of the Root Port.

11. The system of claim 10, wherein each Root Port to perform the error recovery of the detected error without resetting the system is further to:
- discard all inbound requests from the device received after the detected error; and
- drain all inbound requests from the device received before the error.

12. The system of claim 11, wherein each Root Port to perform the error recovery of the detected error without resetting the system is further to:
- generate a master abort completion for each of an original requestor of all pending outbound non-posted transactions, wherein no completion has been received for the pending outbound non-posted transactions.

13. The system of claim 12, wherein each Root Port to perform the error recovery of the detected error without resetting the system is further to:
- generate a master abort completion for each of an original requestor of all discarded outbound non-posted transactions, wherein no completion has been received for the discarded outbound non-posted transactions.

14. The system of claim 9, wherein each Root Port is further to:
- activate the communication link with the device in response to performing the error recovery of the detected error without resetting the system.

15. The system of claim 9, wherein the system is compliant with a Peripheral Component Interconnect Express (PCIe) specification.

16. A method comprising:
- setting one or more types of errors to be monitored for a device coupled with a platform;
- determining whether the device coupled with the platform has an error condition;
- determining whether a type of the determined error condition matches the set one or more types of errors; and
- send an advisory message that an uncorrectable error has been detected;
- in response to the determination that the type of the detected error matches the set one or more types of errors, performing error recovery of the determined error condition without resetting the platform.

17. The method of claim 16, further comprising:
- deactivating a communication link between the device and the platform in response to the determination of the error condition; and
- discarding all outbound requests sent to the device.

18. The method of claim 17, further comprising:
- discarding all inbound requests from the device received after the determined error condition; and
- draining all inbound requests from the device received before the determined error condition.

19. The method of claim 18, further comprising:
- generating a master abort completion for each of an original requestor of all pending outbound non-posted requests, wherein no completion has been received for the pending outbound non-posted requests; and
- sending the master abort completion to each of the original requestor of all pending outbound non-posted requests.

20. The method of claim 19, further comprising:
- generating a master abort completion for each of an original requestor of all discarded outbound non-posted requests, wherein no completion has been received for the discarded outbound non-posted transactions; and
- sending the generated master abort completion to each of an original requestor of all discarded outbound non-posted requests.

21. The method of claim 16, further comprising:
- activating the communication link between the device and the platform in response to performing the error recovery of the error condition without resetting the platform.

22. The method of 16, wherein the platform and the device are compliant at least in part with a Peripheral Component Interconnect Express (PCIe) specification.

* * * * *